US005468425A

United States Patent [19]

Nutter

[11] Patent Number: 5,468,425

[45] Date of Patent: Nov. 21, 1995

[54] GAS-LIQUID CONTACT APPARATUS INCLUDING TRAYS WITH VAPOR APERTURES IN OVERLAPPING PANEL MARGINS

[76] Inventor: Dale E. Nutter, 7935 S. New Haven St., Tulsa, Okla. 74136

[21] Appl. No.: 283,625

[22] Filed: Aug. 1, 1994

Related U.S. Application Data

[63] Continuation-in-part of Ser. No. 77,613, Jun. 17, 1993, Pat. No. 5,360,583, and a continuation-in-part of Ser. No. 216,297, Mar. 23, 1994.

[51] Int. Cl.[6] .................................................. B01F 3/04

[52] U.S. Cl. .................................... 261/114.3; 261/114.5

[58] Field of Search ............................ 261/114.5, 114.3, 261/114.1

[56] References Cited

U.S. PATENT DOCUMENTS

| | | | |
|---|---|---|---|
| 2,903,251 | 9/1959 | Thrift | 261/114.3 |
| 3,039,751 | 6/1962 | Versluis | 261/114.1 |
| 3,233,708 | 2/1966 | Glitsch | 261/114.5 |
| 3,463,464 | 8/1969 | Nutter et al. | 261/114.3 |

*Primary Examiner*—Tim R. Miles
*Attorney, Agent, or Firm*—Beveridge, DeGrandi, Weilacher & Young

[57] ABSTRACT

In a crossflow gas-liquid contact tower, liquid moves horizontally across a plurality of vertically spaced trays, and downwardly from tray-to-tray while gas flows up through openings in the trays to create a liquid-vapor mixture in an active bubble area. Each tray is formed of panels with mutually overlapping margin portions. Overlapping vapor openings are formed in the overlapping margin portions in order to provide the tray with a greater open area and with a more uniform aperture distribution. Preferably, each opening includes an aperture in the plane of the tray, and a deflector overlies the aperture to define lateral vapor outlet slots. The aperture is wider at its upstream end than at its downstream end; and, the deflector has upstream and downstream portions which extend across the ends of the aperture.

14 Claims, 2 Drawing Sheets

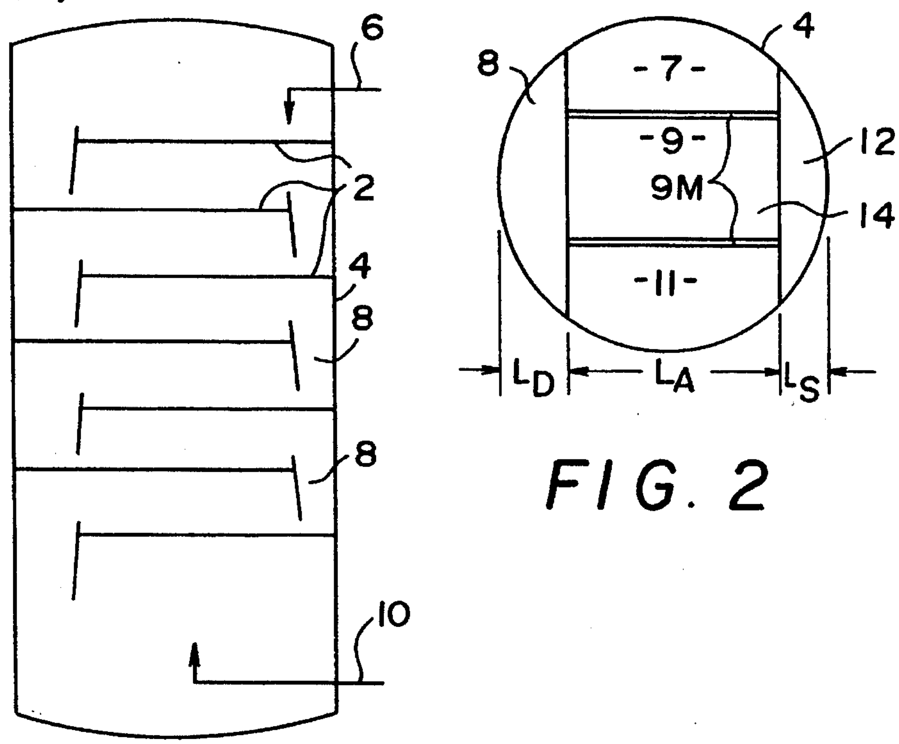
FIG. 1
6
2
4
8
8
10
4
8
-7-
-9-
9M
-11-
12
14
$L_D$
$L_A$
$L_S$
FIG. 2
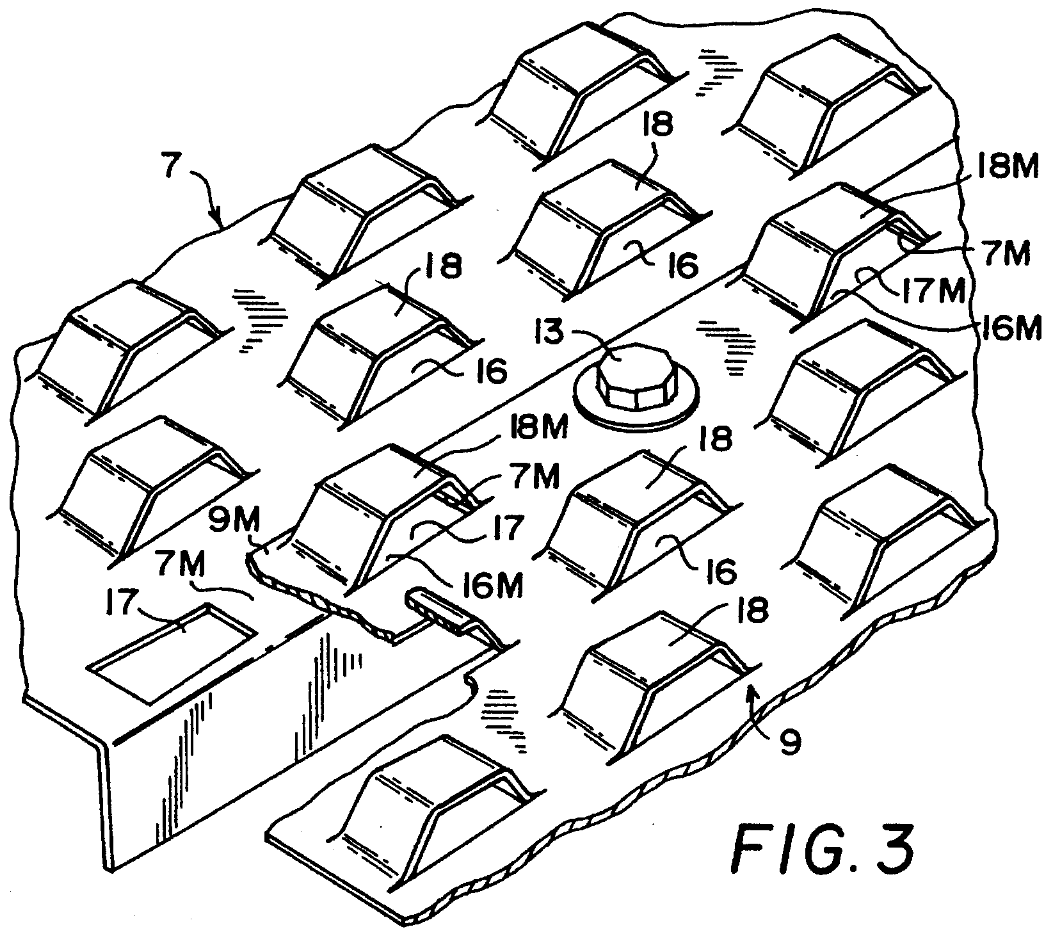
7
18
18M
7M
17M
16M
16
18
13
18M
7M
9M
17
16M
7M
17
16
18
18
9
FIG. 3

FIG. 4
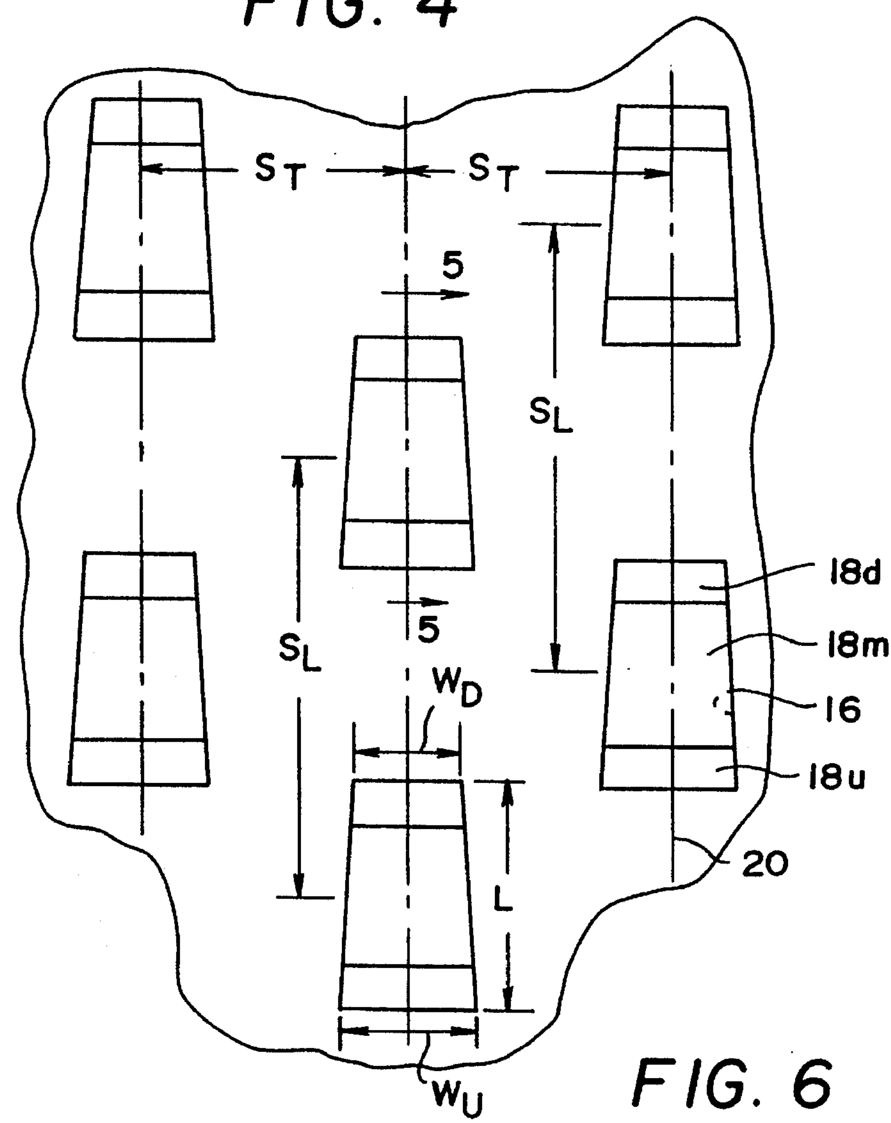
FIG. 6
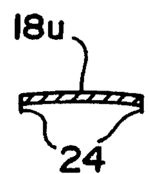
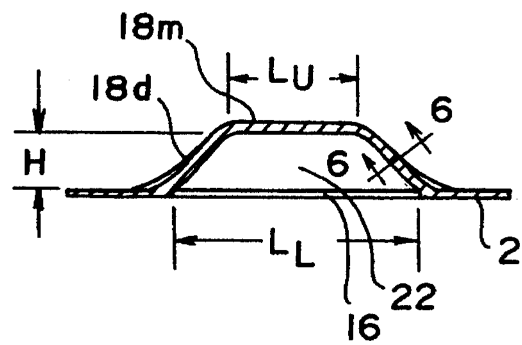
FIG. 5

GAS-LIQUID CONTACT APPARATUS INCLUDING TRAYS WITH VAPOR APERTURES IN OVERLAPPING PANEL MARGINS

REFERENCE TO RELATED APPLICATIONS

This is a continuation-in-part of U.S. patent application Ser. No. 08/077,613 filed Jun. 17, 1993, U.S. Pat. No. 5,360,583, and U.S. patent application Ser. No. 08/216,297 filed Mar. 23, 1994. Both of these applications are incorporated herein by reference.

BACKGROUND OF THE INVENTION

This invention relates to gas-liquid contact apparatus, and it particularly pertains to novel crossflow trays for use in fractionation towers and other apparatus.

In a typical crossflow tray installation, a number of horizontal tray with openings therein are mounted in a sealed, vertically elongated vessel known in the industry as a column or tower. Each trays is formed of a plurality of panels, and the margin areas of the panels overlap each other and are bolted together. The only openings in the overlapping areas are holes which receive the panel-connecting bolts. Liquid is introduced on the upper surface of the uppermost tray. At the downstream end of each tray, there is a weir which leads to a downcomer; and, the downcomer leads to an unperforated upstream area (the "downcomer seal area") on the next lower tray. Gas is introduced into the lower end of the tower. As the liquid flows across the trays, gas ascends through the openings in the trays and into the liquid to create bubble areas where there is intimate and active contact between the gas and liquid. In the margin area where adjacent panels overlap, there are no openings for ascending vapors. In towers used in high liquid rate systems such as light hydrocarbon distillations and direct contact heat exchange, each tray level may have multiple sets of flow paths including a downcomer, bubbling area and downcomer seal transition area.

Many crossflow trays are simple sieve trays, i.e. decks which have hundreds of circular holes. Some trays have valves associated with the tray openings, and others have fixed deflectors. In an example of the latter, shown and described in U.S. Pat. No. 3,463,346 of Aug. 26, 1969, each tray opening includes a trapezoidal aperture in the plane of the tray deck, and a stationary deflector which overlies and is aligned with the aperture. The deflector and the adjacent deck surface define lateral outlet slots which are oriented to direct vapor which passes up through the aperture in directions which are generally transverse to the flow direction of liquid on the deck.

SUMMARY OF THE INVENTION

The present invention relates to improvements in a type of gas-liquid contact apparatus where a tray supports a body of liquid which moves in a generally horizontal flow direction from an upstream location to a downstream location. The deck is provided with apertures which introduce ascending vapor under pressure into the liquid.

The present invention calls for vapor openings in the overlapping margin areas of adjacent panels, thus providing the tray with a more uniform aperture distribution and with a greater open area than would exist if the overlapping margin areas of the panels had no apertures for ascending vapor.

The invention is applicable to a fluid contact tray having a deck formed of a plurality of interconnected panels. The panels have apertures for introducing ascending vapors under pressure into a body of liquid which is flowing across the upper surface of the tray. A first panel has a margin area; and, a second panel has a margin area which overlies and is connected to the margin area of the first panel.

According to the invention, a plurality of apertures are formed in the margin area of the second panel, a plurality of apertures are formed in the margin area of the first panel, and the apertures in the margin area of the first panel overlap the apertures in the margin area of the second panel. This permits ascending vapors to flow through the overlapping margin areas via the overlapping apertures.

Preferably, each aperture has a longitudinal axis which is parallel to the flow direction, and each aperture is tapered in the plane of the deck from a maximum dimension transverse to the flow direction at its upstream end to a minimum dimension transverse to the flow direction at its downstream end. Deflector members overlie the apertures. Each deflector includes an upstream portion, a central portion, and a downstream portion. Each upstream portion extends above the deck at an upstream end of the associated aperture, and it lies across the entire maximum transverse extent of the aperture so that the entirety of the aperture is shielded from liquid which is moving in the flow direction toward the aperture. Each downstream portion extends above the deck at the downstream end of its aperture, and it lies across the entire transverse extent of the downstream end of the aperture to prevent vapors from impelling liquid in a downstream direction. Each deflector member and the adjacent deck define lateral outlet slots which are oriented to direct vapor which passes up through the aperture in a direction which is generally transverse to the flow direction of liquid on the deck.

It is also preferred that the outlet slots have an upper edge no longer than about 0.85 inch, a height which is no greater than 0.35 inch, and a lower edge which is no longer than about 1.5 inches. Each aperture, in the plane of the tray deck, has a length no greater than 1.5 inches measured along its longitudinal axis, an upstream width no greater than about 1.0 inch, and a downstream width no greater than 0.75 inch. The centers of the apertures are spaced apart no more than about 3.0 inches longitudinally of the flow direction, and no more than about 2.0 inches transversely of the flow direction.

Additional features are used in preferred embodiments of the invention. The apertures are arranged in longitudinal rows, and the apertures in adjacent longitudinal rows are staggered so that an aperture in one row has a longitudinal position which is midway between the longitudinal positions of two apertures in an adjacent row. The central portions of the deflectors are supported on the deck by the upstream and downstream deflector portions. The upstream baffle portions and the downstream baffle portions are inclined to form obtuse angles with the deck. Each deflector is integral with the deck and is, in vertical projection, substantially geometrically identical to its respective aperture. The outlet slots are trapezoidal, and burrs are formed around them. Each outlet slot has an area of about 0.3 square inch. This is greater than the area (0.2 square inch) of a one-half inch circular opening in a conventional sieve tray.

BRIEF DESCRIPTION OF THE DRAWINGS

FIG. 1 is a diagrammatic drawing of the general arrangement of crossflow trays in a gas-liquid contact tower.

FIG. 2 is a diagrammatic plan view of the tower of FIG. 1, showing the general proportions of the downcomer area, perforated active bubble area, and unperforated downcomer seal area.

FIG. 3 is a perspective view showing a group of openings in a tray constructed according to the invention.

FIG. 4 is a bottom view of a portion of the tray, showing the aperture shapes, proportions and spacing.

FIG. 5 is a transverse sectional view as seen along the section line 5—5 in FIG. 4.

FIG. 6 is a sectional view taken along the line 6—6 in FIG. 5 to show the curvature and burrs which are formed in the deflector.

DETAILED DESCRIPTION

FIG. 1 shows, in schematic form, the basic environment of crossflow trays constructed according to the invention. A plurality of horizontal trays 2 are mounted in a vertical tower 4 where they are vertically spaced from each other. Liquid is fed to the uppermost tray by a liquid supply line 6. Downcomer passages 8 lead from the downstream ends of each of the trays to the upstream end of the next lower tray. Openings (not shown in FIG. 1) are formed in the trays so that air or other gas introduced into a lower end of the tower by a gas supply line 10 will ascend through the tower, passing up through the tray openings and into the liquid on the trays 2. The tower has a vapor outlet at its upper end, and a liquid outlet at its lower end.

The proportions of a typical tray are shown in FIG. 2. Each tray has an unperforated upstream segment 12 (the downcomer seal transition) which receives liquid from a downcomer 8 and redirects the liquid flow to an active area 14 ("bubbling area") where the openings are located. As previously mentioned, the reference numeral 8 identifies the downcomer passage. In the downcomer passage, disengagement or separation occurs between the components of the liquid-vapor mixture. The separated vapor component ascends, and the liquid component is delivered to the unperforated downcomer seal transition area at the upstream end of the next tray.

In a typical installation where the tower 4 has a diameter of 48 inches, the length $L_S$ of the unperforated upstream segment 8 is about 8 inches, and the downcomer 8 has a horizontal dimension $L_D$, of about 10 inches. The active area 14 of the deck has a length $L_A$ of about 30 inches. This example is representative of conventional crossflow tray design practice.

In FIG. 2, it will be seen that the tray deck is formed of four panels, 7, 9, 11, and 12. The center panel 9 has a longitudinally extending margin areas 9M which overlie corresponding margin areas of the outboard panels 7 and 11. The overlapping margin areas are connected together by bolts in a conventional manner.

FIG. 3 shows portions of panels 7 and 9 of the deck, connected together by a bolt 13. The margin 9M of panel 9 overlies the margin 7M of panel 7. Both panels 7 and 9 have a plurality of apertures 16 with overlying deflectors 18. This drawing shows tray apertures arranged in adjacent longitudinal rows, and the aperture positions are staggered from row-to-row so that an aperture 16 in one row has a longitudinal position which is midway between the longitudinal positions of two longitudinally adjacent apertures 16 in an adjacent row.

According to conventional practices, the overlapping margin areas 7M and 9M would not have apertures for ascending vapors. However, according to the present invention, there are such apertures. These apertures 16M with overlying deflectors 18M are formed in the margin area 9M of panel 9, and they overlie apertures 17 which are formed in the margin area 7M of the panel 7. Although various arrangements are possible, there is preferably one bolt hole between each two longitudinally successive apertures 17.

The apertures 17 are shown as being trapezoidal, but they may have other shapes. For manufacturing convenience, two adjacent circular holes may be used in lieu of a single aperture 17.

Each of the apertures 16 and 16M has an overlying deflector 18. As shown in FIG. 5, each deflector 18 has an upstream portion **18*u*, a midportion 18*m*, and a downstream portion 18*d*. The midportion 18*m* is generally horizontal, and the upstream and downstream portions 18*u*, 18*d*** are inclined upwardly and downwardly, respectively, relative to the liquid flow direction.

In plan view, each deflector and its respective aperture are substantially geometrically identical. The dimensions of an aperture 16 formed in the plane of the deck are shown in FIG. 4. Its length L is no greater than 1.5 inches, its upstream width $W_U$, is no greater than about 1.0 inch, and its downstream width $W_D$ is no greater than 0.75 inch. The centers of the apertures are spaced apart longitudinally of the flow direction by distances $S_L$ which are no more than about 3.0 inches. Transversely of the flow direction, the spacing $S_T$ between the centerlines 20 of adjacent rows is no more than about 2.0 inches.

FIG. 5 is a side view showing the outlet slot configuration associated with one of the deflectors. The outlet slot 22 is generally trapezoidal. Its lower edge is defined by the upper surface of the tray deck, and its upstream edge, downstream edge, and upper edge are defined by the lower edges of the deflector. Its upper edge has a length $L_u$ no greater than 0.85 inch, a height H which is no greater than 0.35 inch, and a lower edge which has a length $L_L$ no greater than 1.5 inches.

Close inspection of the trays has revealed that the fabrication process produces a transverse upward convexity in the baffle portions **18*u* and 18*d*, and burrs around the outlet slots. FIG. 6 shows these burrs 24 in the plane identified by the section line 6—6 in FIG. 5. In addition to enhancing tray efficiency by increasing local turbulence to increase the interfacial contact area between the vapor and liquid at the slot edges, it is likely that these burrs 24** contribute to improved weeping performance of the tray.

The dimensions used in a preferred embodiment of the invention are shown in the row identified as Type MVG in the following table which also shows the corresponding dimensions for the openings in Type L trays and Type S trays which are in the prior art.

| | Center-to-Center Distance | | Aperture Dimensions | | | Slot Dimensions | | |
|---|---|---|---|---|---|---|---|---|
| | | | Upstream | Downstream | | Upper | Lower | |
| | Transverse $S_T$ | Longitudinal $S_L$ | Width $W_U$ | Width $W_D$ | Length L | Length $L_U$ | Length $L_L$ | Height H |
| Type L | 2.375 | 6.125 | 1.25 | 0.75 | 4.595 | 3.6 | 4.595 | 0.375 |
| Type S | 2.375 | 3.375 | 1.25 | 1.0 | 2.375 | 1.0 | 2.375 | 0.500 |
| Type MVG | 1.5 | 2.5 | .75 | .59 | 1.313 | 0.75 | 1.313 | 0.313 |

It was found by experimentation that the Type L tray resulted in unacceptable entrainment level when liquid rates are low and vapor rates are high. It was known in sieve tray technology that smaller openings produced less entrainment, which led to the design of the Type S trays, the objective of which was to reduce entrainment to a level which would compare favorably to that of standard sieve trays having deflectorless circular openings of 0.5 inch diameter. The larger openings of the Type L and Type S trays are successful in the respect that they reduce the risk of fouling in commercial service.

From the foregoing, it will be seen that this invention provides a fluid contact tray and apparatus which has particular performance and cost advantages. Persons skilled in the art will recognize that these advantages can be realized from trays which differ from the embodiments described above. For example, the trays may be sieve trays or valve trays. The openings may have any shape, and the deflectors 18 can be omitted. Therefore, it is emphasized that the invention is not limited to the disclosed embodiments and does include variations and modifications which fall within the spirit of the following claims.

I claim:

1. A fluid contact tray for supporting a body of liquid moving thereacross in a generally horizontal flow direction from an upstream location to a downstream location, comprising, a deck formed of a plurality of interconnected panels with apertures for introducing ascending vapors under pressure into said liquid, a first said panel having a margin area, a second said panel having a margin area which overlies and is connected to said margin area of said first panel, a plurality of apertures formed in said margin area of said first panel, a plurality of apertures formed in said margin area of said second panel, said apertures in the margin area of the first panel overlapping said apertures in said margin area of the second panel so that ascending vapors flow through the overlapping margin areas via the apertures which overlap, said apertures in the margin area providing the tray with a more uniform apertures distribution and a greater open area than would exist if the margin areas of the panels had no apertures for ascending vapors.

2. A fluid contact tray according to claim 1 wherein each of said apertures is tapered in the plane of the deck from a maximum dimension transverse to said flow direction at its upstream end to a minimum dimension transverse to said flow direction at its downstream end;

a plurality of deflector members each overlying and aligned with a respective one of said apertures, each deflector member including a upstream portion, a central portion, and a downstream portion; said central portion being connected to said upstream and downstream portions;

each said upstream portion extending above the deck at an upstream end of one of said apertures and lying across the entire maximum transverse extent of its respective aperture so that the entirety of the aperture is shielded from liquid which is moving in the flow direction toward the aperture, each said downstream portion extending above the deck at the downstream end of one of said apertures and lying across the entire transverse extent of the downstream end of the respective aperture to prevent vapors from impelling liquid in a downstream direction, each said deflector member and said deck defining lateral outlet slots which are oriented to direct vapor which passes up through the aperture in a direction which is generally transverse to the flow direction of liquid on the deck.

3. A fluid contact tray according to claim 2 wherein said outlet slots each have an upper edge which is no longer than about 0.85 inch, a height which is no greater than 0.35 inch, and a lower edge which is no longer than about 1.5 inches.

4. A fluid contact tray according to claim 2 in which said upstream baffle portions and said downstream baffle portions are inclined to form obtuse angles with said deck.

5. A fluid contact tray according to claim 2 in which each of said deflector members is integral with said deck and is, in vertical projection, substantially geometrically identical to its respective aperture.

6. A fluid contact tray according to claim 2 having burrs around said outlet slots.

7. A fluid contact tray according to claim 2 wherein each said outlet slot has an area of about 0.3 square inches.

8. A fluid contact tray according to claim 2 wherein said apertures are arranged in longitudinal rows, said apertures in adjacent longitudinal rows being staggered so that an apertures in one row has a longitudinal position which is midway between the longitudinal positions of two apertures in an adjacent row.

9. A fluid contact tray according to claim 2 wherein each of said apertures has a length measured along its longitudinal axis which is no greater than 1.5 inches, an upstream width which is no greater than about 1.0 inch, and a downstream width which is no greater than 0.75 inch.

10. A plurality of fluid contact trays according to claim 2 in combination with a tower, said trays being mounted in said tower and being vertically spaced from each other; and downcomer conduit means leading from downstream locations of said trays to upstream locations of trays therebelow.

11. Apparatus according to claim 2 wherein said apertures have centers which are spaced apart no more than about 3.0 inches longitudinally of said flow direction and no more than about 2.0 inches transversely of the flow direction.

12. Apparatus according to claim 1 wherein said apertures have centers which are spaced apart no more than about 3.0 inches longitudinally of said flow direction and no more than about 2.0 inches transversely of the flow direction.

13. A fluid contact tray according to claim 1 wherein each of said apertures has a length measured along its longitudinal axis which is no greater than 1.5 inches, an upstream width which is no greater than about 1.0 inch, and a downstream width which is no greater than 0.75 inch.

14. A plurality of fluid contact trays according to claim 1 in combination with a tower, said trays being mounted in said tower and being vertically spaced from each other; and downcomer conduit means leading from downstream locations of said trays to upstream locations of trays therebelow.

* * * * *